Sept. 20, 1966   W. E. SEVRENCE   3,273,417
CONTROL CABLE CORE ELEMENT POSITIONING MEANS
Filed April 6, 1964
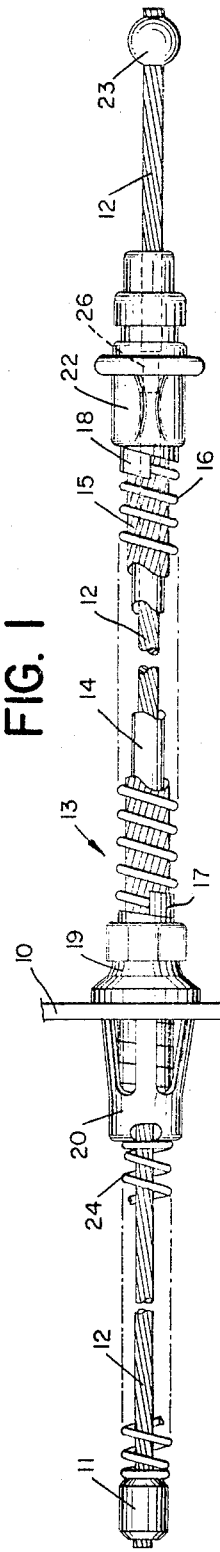
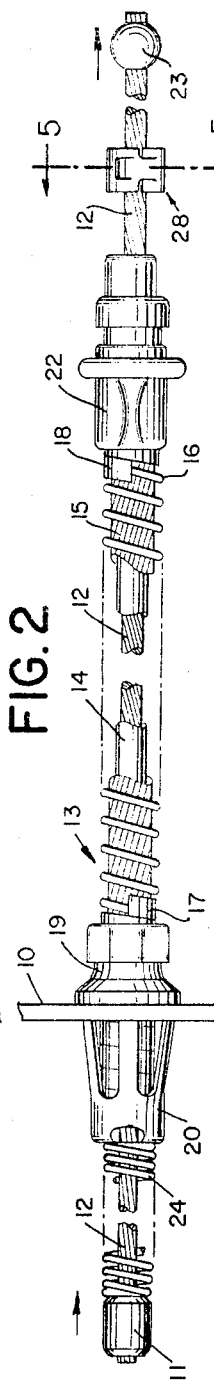
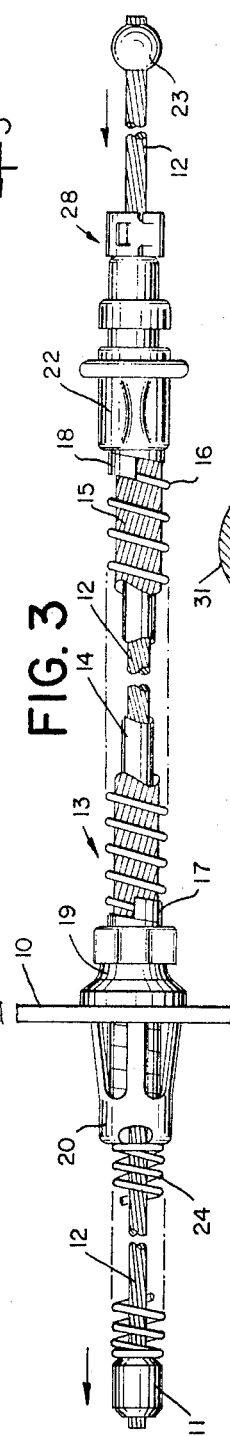
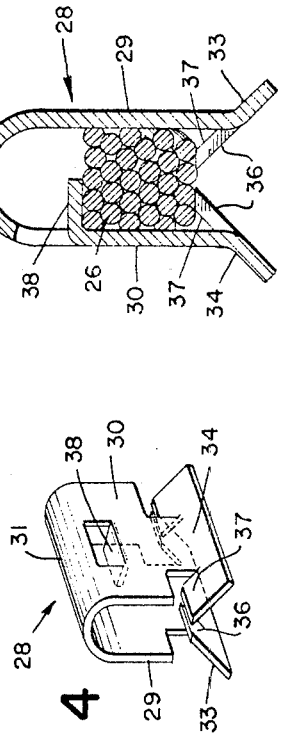
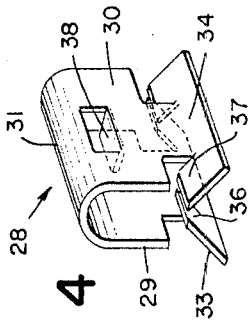
INVENTOR
WARREN E. SEVRENCE
BY
ATTORNEYS United States Patent Office 3,273,417
Patented Sept. 20, 1966

3,273,417
CONTROL CABLE CORE ELEMENT POSITIONING
MEANS
Warren E. Sevrence, Adrian, Mich., assignor to American Chain & Cable Company, Inc., New York, N.Y., a corporation of New York
Filed Apr. 6, 1964, Ser. No. 358,148
8 Claims. (Cl. 74—501)

This invention relates to means for positioning the core element of a control cable. In particular, it concerns means for limiting the travel of a control cable core element in its casing so that a member actuated by the core element is located in a predetermined position.

Since the present invention provides a solution to a specific problem in the actuation of automotive brakes it will be described in that context, but it should be apparent that the invention is also generally applicable in many other installations. Automotive brakes are actuated by a J hook or the like to expand the brake shoes against the drum and spring-biasing means are provided to urge the hook away from its actuating position so that the brake shoes are nominally located out of engagement with the drum. It is a common requirement that the nominal or rest position of the hook be such that the brake shoes are only slightly spaced from their associated drum to minimize the free travel of the shoes from rest to operating positions when the driver actuates the brake. The hook of an automotive brake is actuated by a control cable assembly comprising a casing anchored at the point where it enters the brake housing and a core element axially translatable within the casing between its attachment at the end of the J hook and the operating means controlled by the driver. When the driver operates the brake, tension is applied to the core element which pulls the J hook against the spring-bias in the brake assembly in a direction displacing the brake shoes from their position to an engaged or operating position.

Means have been devised for limiting the travel of the core element into the casing toward the actuated J hook member so that the brake shoes are maintained in the desired rest position spaced slightly relative to the drum as mentioned above. This eliminates inadvertent engagement of the shoes on the drum due to tension imposed on the core element by inertia forces which are common during the sudden stopping and starting of city driving, and thus reducing brake shoe drag and increasing the life of the shoes enormously. The conventional means for positioning the core element of a brake control cable consists of two buttons disposed about the core element adjacent the end of the casing remote from the brake housing. One button is crimped in place at a predetermined distance on the core element from the remote end thereof which is to be attached to the brake assembly J hook, and this distance has a known relation to the brake shoe rest position when the entire system is assembled. The other button is slideable on the core element between the first-mentioned button and the adjacent end of the casing when the automotive manufacturer receives the control assembly. The control cable is installed by attaching one end of the core element to the J hook and pulling the core element in its operating direction against the spring-bias in the brake housing until the crimped-on button is moved away from the adjacent casing end a predetermined distance, say five inches, which is known to have located the brake shoes at their desired spacing from the drum in rest position. The core element is then held in that desired position while the slideable button is crimped securely to the core element immediately adjacent the end of the casing, so that when the core element is released the second button secured thereto prevents any further return of the core element into the casing in response to the spring-biasing force within the brake housing.

While this approach to the location of a brake cable core element is effective in its ultimate function, there is substantial cost involved in the use of the aforementioned two buttons and in the rather exacting installation procedure which they require. It is the object of the present invention to provide simplified means for so locating a brake cable core element which eliminates the plurality of attachments on the core element and avoids the necessity of precise manipulation of the parts during assembly.

The invention is broadly applicable to a control cable wherein a core element is axially translatable through a casing fixed at least at one point along its length to displace an actuated member between first and second positions. The improvement of the invention resides in core element positioning means for nominally locating the actuated member in its first position. This positioning means comprises stop means attachable to the core element to abut one end of the casing, and mounting means movable through the casing and located on the core element to receive the stop means in fixed engagement at a point on the core element immediately outside the end of the casing when the actuated member is in its first position. The stop means is preferably a substantially U-shaped clip member having resilient opposed legs spaced apart a distance less than and each being longer than the core element diameter to grip the core element therebetween. The mounting means is preferably a compressed portion on the core element having cross sectional dimensions of a maximum not greater than and a minimum less than the diameter of the core element.

A primary advantage of this construction over the prior art is that since the mounting means is movable through the casing and has a predetermined position only one element need be attached and without further measurement during assembly. When the new control cable is installed in an automotive brake system, the core element is attached to the brake J hook as before and pulls it against the spring-bias in the brake housing toward the desired rest position where the brake shoes are spaced slightly from the drum. When this rest position is reached, the mounting means on the core element emerges immediately outside the end of the casing to receive the stop means. When the core element is released, the attached stop means prevents it from returning through the casing beyond that position which establishes the brake shoes in their nominal rest position. No measurements from reference points on the core element are required during installation of this assembly in an automotive brake system as with the prior art positioning means, and the stop means in the form of the U-shaped clip member can be readily secured to the mounting means without any demanding crimping operation.

A preferred embodiment of the invention is described hereinbelow with reference to the accompanying drawing, wherein FIG. 1 is a longitudinal elevation partly broken away of the improved control cable when installation in an automotive brake system is commenced;

FIG. 2 is a similar view after the stop means has been affixed to the mounting means on the core element;

FIG. 3 is a similar view after the assembly has been installed and the core element is in its desired limited position;

FIG. 4 is an enlarged perspective of the new stop means; and

FIG. 5 is an enlarged section taken along the line 5—5 of FIG. 2.

Referring first to FIG. 1, an automotive brake assembly is enclosed in a housing 10 and includes a J hook lever or the like for operating its shoes against the drum. The conventional J hook is actuated by a button 11 affixed at one end of a stranded wire core element 12 which is axially translatable within a casing 13 of a control cable. The casing comprises a plastic liner 14, a plurality of long-lay wires 15 and a binder wire 16. The opposite ends of the casing 13 are held together by wrapped ferrules 17 and 18 of flat wire. A first end fitting 19 at one end of the casing 13 is provided with a fastener 20 by which that end of the casing can extend through and be anchored to the brake housing 10. At the opposite end of the casing, an end fitting 22 is provided about the ferrule 18 and it may or may not be anchored depending upon the particular installation.

The core element 12 extends entirely through the casing 13 from a button 23 at the operator's end of the assembly to the aforementioned button 11 which is to be attached to the brake J hook. A compression spring 24 is located concentrically about the core element between the button 11 and the fastener 20 in the brake housing 10. It is the function of the compression spring 24 to bias the core element 12 to the left as shown in FIGS. 1 to 3, which is a direction moving the J hook and brake shoes away from both their rest and operating positions. When tension is applied to the core element 12 by means of the button 23 at the operator's end thereof, the compression spring 24 is contracted and the J hook of the brake moves the shoes toward the rest position and still further toward their engaged position with the brake drum.

When the improved control assembly is installed and tension is applied to the core element 12 to displace it to the right as shown in the drawings, the compression spring 24 is contracted and mounting means 26 (appearing in phantom in FIG. 1) emerges from the fitting 22 at the operator's end of assembly. As shown in FIG. 5, the mounting means 26 is a compressed portion of the core element which has a substantially square cross section and a length corresponding to that of stop means attachable thereto as described below. The compressed portion may be crimped to a degree which does not appreciably stress the strands of the core element but which imparts the cross sectional configuration shown in FIG. 5. The maximum or diagonal dimension of this cross section is substantially equal to, and may be slightly less than, the diameter of the undeformed portion of the core element 12. The minimum dimension along the side of the mounting means 26 is measurably less than the diameter of the remainder of the core element 12.

This form of mounting means formed integrally in the core element 12 by a crimping operation in no way interferes with passage of its portion of the core element through the casing 13. Knowing the desired position of the brake J hook which locks the shoes at their rest spacing from the drum, the crimped mounting means 26 can be located on the core element 12 at a predetermined point which will place it immediately outside the end fitting 22 when the J hook is in its appropriate rest position. This can be done during manufacture of the control assembly simply by attaching the button 11 the required distance from the crimped mounting means 26. Consequently, before the device of FIGS. 1 to 3 is installed the core element 12 with its mounting means 26 may be directed through the casing 13 toward the right as shown in the drawing and the button 23 may be attached thereafter.

During installation of the control cable assembly in an automobile the core element 12 is attached to the brake J hook by the button 11 and is pulled to the rightward position shown in FIG. 2 so that the crimped mounting means 26 is fully exposed to the right of the end fitting 22. Stop means 28 are then attached to the core element 12 at and by means of the mounting means 26 thereof.

As shown in FIGS. 2 to 5, the stop means comprises a substantially U-shaped spring steel resilient clip member having opposed legs 29 and 30 spaced apart, a distance slightly less than the length of one side of the square cross section of the mounting mean 26. Each of the legs 29 and 30 is longer than the diameter of the core element 12 to grip the core element therebetween. The length of the stop means 28 is substantially equal to but not greater than the length of the crimped mounting means 26. Respectively end portions of the legs 29 and 30 remote from the closed end 31 of the clip member define integral opposed flared elements 33 and 34 respectively which project outwardly to guide the core element into position between the legs 29 and 30. These leg end portions also define integral pairs 36 and 37 of opposed gripping elements projecting inwardly toward the closed end 31 to engage and lock the core element in position between the legs 29 and 30. The clip member also includes an integral seat element 38 projecting inwardly from the leg 30 adjacent the closed end 31 to limit movement of the element toward the closed end 31 when the core element is locked in position between the legs 29 and 30. As shown in FIG. 4, the flared elements 33 and 34, the gripping elements 36 and 37 and the seat element 38 may be configured portions of the clip member defined by appropriate cut-out sections.

To attach the stop means 28 to the mounting means 26 of the core element 12, the flared elements 33 and 34 are located to each side of the mounting means 26 and the stop means is pushed forcibly against the core element. The clip member is sufficiently resilient to permit the legs 29 and 30 thereof to spread apart so that the clip member snaps over the crimped mounting means 26 of the core element 12 into the position shown in FIG. 5. In that locked position, the gripping elements 36 and 37 project inwardly against the square cross section of the crimped mounting means 26 to hold it in place against the seat element 38. Axial movement of the stop means 28 is entirely prevented by its containment within the compressed region of the crimped mounting means 26.

When the stop means 28 is thus attached to the mounting means 26 of the core element 12, the control cable is in the position shown in FIG. 2. Whatever means have been provided to pull the core element to the right to permit the stop means to be attached is then released so that the compression spring 24 expands and displaces the core element to the left. Its displacement in this direction ceases when the stop means 28 abuts against the end fitting 22 of the casing 13 as shown in FIG. 3. Because of the predetermined location of the mounting means 26 described above, the stop means 28 holds the button 11 at a certain position shown in FIG. 3 which sets the J hook and brake shoes at precisely their desired rest position with respect to the brake drum. No amount of inertia forces on the FIG. 3 assembly during normal use in an automobile can cause inadvertent displacement of the core element 12 and therefore the brake shoes are maintained in the proper rest position without dragging unintentionally against the drum. This end result is achieved in accordance with the invention simply by snapping improved stop means 28 onto novel mounting means 26 during installation of the brake control system in the automobile.

I claim:

1. In a control cable wherein a core element is axially translatable through a casing fixed at least at one point along its length to displace an actuated member between first and second positions, core element positioning means for nominally locating said actuated member in its first position comprising:
   (A) stop means attachable to said core element to abut one end of said casing, and
   (B) mounting means movable through said casing and located on said core element to receive said stop means in fixed engagement at a predeterminded point on said core element immediately outside said end of the casing when said actuated member is in its first position.

2. In a control cable according to claim 1, said stop means comprising a substantially U-shaped clip member having resilient opposed legs spaced apart a distance less than and each being longer than the core element diameter to grip the core element therebetween.

3. In a control cable according to claim 1, said mounting means comprising a compressed portion on said core element having cross sectional dimensions of a maximum not greater than and a minimum less than the diameter of the core element.

4. In a control cable wherein a stranded core element is axially translatable under tension through a flexible casing fixed at both ends to displace from rest to operating positions an actuated member which is adjacent one end of said casing and is biased away from both of said positions against the core element tension, core element positioning means for nominally locating said actuated member in its rest position comprising:
  (A) stop means attachable to said core element to abut the opposite end of said casing from the first-mentioned end thereof, and
  (B) mounting means movable through said casing and located on said core element to receive said stop means in fixed engagement at a predetermined point on said core element immediately outside said opposite end of the casing when said actuated member is in its rest position.

5. In a control cable according to claim 4, said stop means comprising:
  (A) a substantially U-shaped resilient clip member having opposed legs spaced apart a distance less than and each being longer than the cable diameter to grip the core element therebetween; and
  (B) respective leg end portions remote from the closed end of the clip member defining
    (i) opposed flared elements at the extremities of said leg end portions projecting outwardly to guide said core element into position between said clip member legs, and
    (ii) opposed gripping elements projecting inwardly toward said closed end to engage and lock said core element in position between said clip member legs.

6. In a control cable according to claim 4, said mounting means comprising a compressed portion on said core element having a substantially square cross section of a maximum dimension substantially equal to but not greater than and a minimum dimension less than the diameter of the core element.

7. Stop means attachable to a cable comprising:
  (A) an integral substantially U-shaped spring resilient clip member having opposed legs spaced apart a distance less than and each being longer than the cable diameter to grip the cable therebetween;
  (B) respective leg end portions remote from the closed end of the clip member defining
    (i) integral opposed flared elements at the extremities of said leg end portions projecting outwardly to guide said cable into position between said clip member legs, and
    (ii) integral pairs of opposed gripping elements projecting inwardly toward said closed end to engage and lock said cable in position between said clip member legs; and
  (C) an integral seat element projecting inwardly from one of said legs adjacent said closed end to limit movement of said cable toward said closed end when said cable is locked in position between said clip member legs.

8. In a control cable wherein a core element is axially translatable through a casing fixed at least at one point along its length to displace an actuated member between first and second positions, core element positioning means for nominally locating said actuated member in its first position comprising:
  (a) mounting means movable through said casing and located on said core element to receive said stop means in fixed engagement at a predetermined point on said core element immediately outside said end of the casing when said actuated member is in its first position, said mounting means comprising a compressed portion on said core element having a cross sectional dimension of a maximum not greater than and a minimum less than the diameter of the core element, and
  (b) stop means attachable to said core element to abut one end of said casing, said stop means comprising an integral substantially U-shaped clip member having resilient opposed legs
    (1) spaced apart a distance less than and each being longer than the core element diameter, and
    (2) defining an opening conforming in shape to and gripping said mounting means of said core element.

References Cited by the Examiner

UNITED STATES PATENTS

| | | | |
|---|---|---|---|
| Re.22,543 | 9/1944 | Tinnerman | 85—36 X |
| 365,755 | 6/1887 | Moore | 74—503 X |
| 972,989 | 10/1910 | Bond | 74—503 X |
| 1,038,664 | 9/1912 | Schnell | 85—8.8 |
| 1,088,402 | 2/1914 | Burns | 85—8.8 |
| 1,798,009 | 3/1931 | Arens | 74—502 |
| 3,198,059 | 8/1965 | Phaneuf et al. | 88—1 |

FRED C. MATTERN, JR., *Primary Examiner.*

BROUGHTON G. DURHAM, *Examiner.*

C. F. GREEN, *Assistant Examiner.*